Dec. 22, 1936.   C. DORNIER   2,064,970
WING STRUCTURE FOR AIRCRAFT
Filed July 27, 1933   2 Sheets-Sheet 1
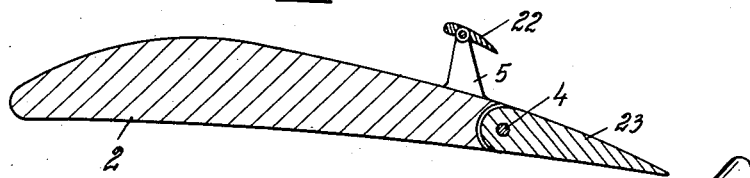
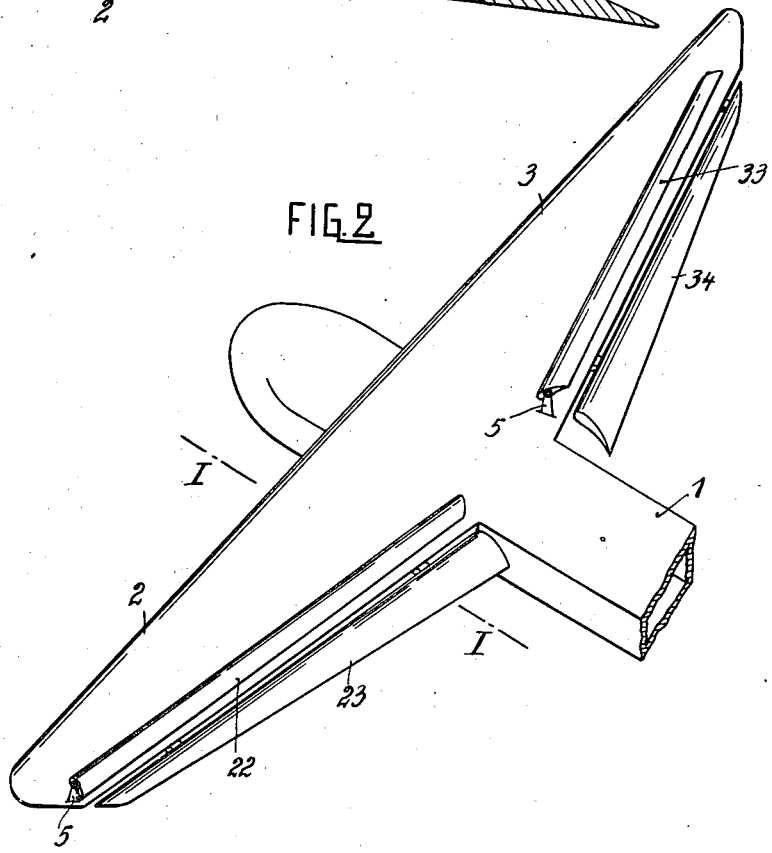
Inventor:
Claude Dornier
by Karl Michaelis
Atty.

Dec. 22, 1936.   C. DORNIER   2,064,970
WING STRUCTURE FOR AIRCRAFT
Filed July 27, 1933   2 Sheets-Sheet 2
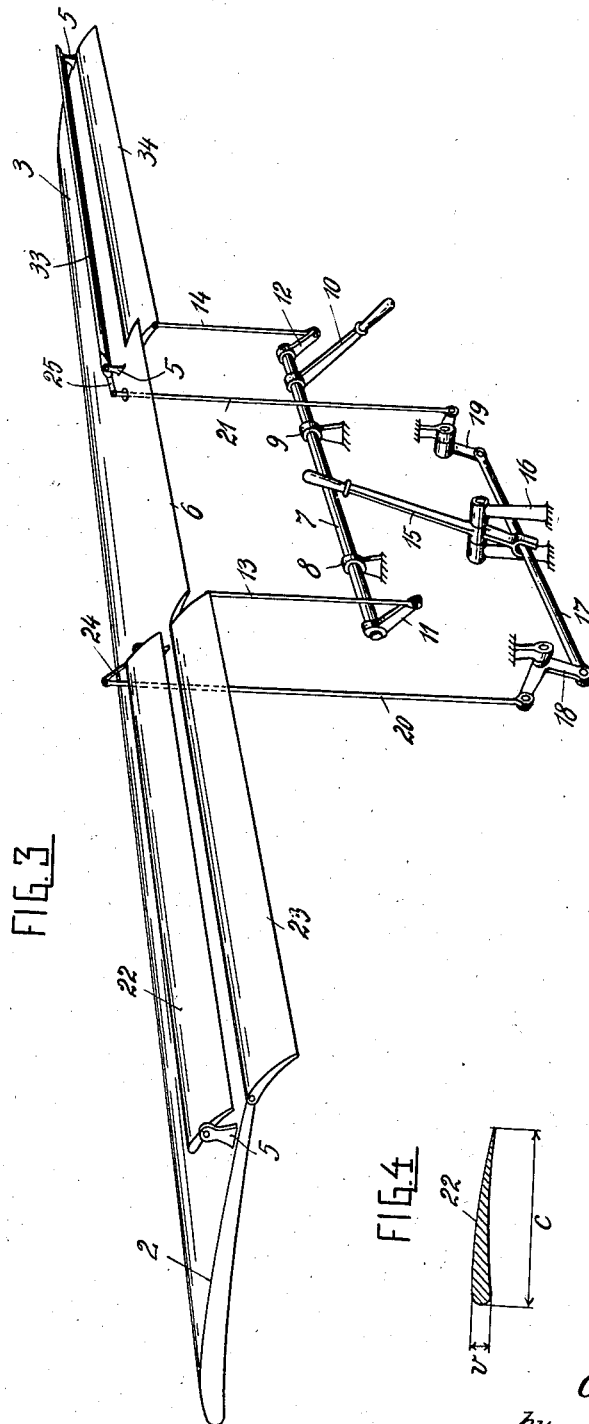
Inventor:
Claude Dornier
by Karl Michaelis
Atty.

Patented Dec. 22, 1936

2,064,970

UNITED STATES PATENT OFFICE 2,064,970

WING STRUCTURE FOR AIRCRAFT

Claude Dornier, Friedrichshafen-on-the-Bodensee, Germany, assignor to Dornier-Metallbauten G. m. b. H., Friedrichshafen-on-the-Bodensee, Germany Application July 27, 1933, Serial No. 682,399
In Germany September 9, 1932

4 Claims. (Cl. 244—42)

My invention relates to a wing structure for aircraft, such as aeroplanes, in which trailing elevators are hinged to a wing or wings to increase their lift by varying the aerofoil of the wings, and ailerons are provided.

At large positive aileron angles (the angle is positive when the trailing edge of the aileron is below the neutral position), the break in the flow of the air along the upper face of the wing is very abrupt which is aerodynamically detrimental. It has already been proposed to provide fixed or movable surfaces above the leading edges of the ailerons, where the ailerons are hinged to the wings, to prevent the abrupt break. Such surfaces, however, with the means for mounting them, represent undesirable extra weight.

It is an object of my invention to eliminate this extra weight and to this end I arrange the surfaces themselves to form the ailerons, so that only two elements are required, and not three, as in the old wing structures above referred to. In other words: the aileron, which must be present under all conditions, performs, besides its own function also the function of the above-mentioned surface.

In a wing structure according to my invention I provide, above the point where the elevator, or elevators, are hinged to the trailing portion of the corresponding wing, an aileron, preferably of high camber, which performs the double function mentioned above. In the case of a wing structure with a pair of wings, such as usually provided in aeroplanes, a control is provided for turning the elevators on both wings in the same direction, and for turning the ailerons on the individual wings in opposite directions.

In the drawings affixed to this specification and forming part thereof the wing structure of an aeroplane embodying my invention is illustrated diagrammatically by way of example.

In the drawings

Fig. 1 is a cross-section of a wing on the line I—I in Fig. 2.

Fig. 2 is a perspective illustration of the front end of a fuselage and of the wing structure.

Fig. 3 is a perspective illustration of the controls for the elevators and the ailerons on the two wings of an aeroplane, and Fig. 4 is a cross-section of an aileron.

Referring to the drawings and first to Figs. 1 and 2, 1 is the fuselage of an aeroplane, only the front end of which is shown, 2 and 3 are the wings of its wing structure, 22 and 33 are the ailerons and 23 and 34 the elevators on the wings 2 and 3, respectively; the elevators 23 and 34 are hinged to the trailing portions of the corresponding wings and will therefore be referred to as "trailing elevators". One of the hinge pins is shown at 4 in Fig. 1. 5 are suitable posts or brackets on the wings 2 and 3 in which the ailerons 22 and 33 are mounted to turn. It will appear that the ailerons 22 and 33 are supported near the hinges of the trailing elevators and above the wings and the trailing elevators. They are sufficiently close to the hinges to obviate a break in the flow of air along the upper face of the wing at positive elevator angles.

Referring now to Fig. 4, the camber of the aileron aerofoil, i. e., the ratio of the chord $c$ to the departure $v$ from the chord, $$\frac{c}{v}$$

should be large, so that the aerofoil of the ailerons is substantially flat.

Ailerons, trailing elevators and surfaces preventing an abrupt break of the air flow at the hinge of the ailerons are old in the art. Ailerons are invariably provided in an aeroplane, being indispensable for impressing a rolling moment on the plane. Trailing elevators, which are not indispensable, serve for varying the lift of the wings by varying their aerofoil. Fixed or movable surfaces for preventing the aforesaid break in the flow of the air are old, as mentioned above. A fixed surface is described for instance in German Patent 538,519, and a movable surface is described for instance in German Patent 542,471. In both cases, however, the surfaces are provided in combination with ailerons, and not with trailing elevators as in the present case where the surfaces themselves form the ailerons.

Referring now to Fig. 3, the wings 2 and 3, and the central portion 6 connecting them, are here shown with parallel leading and trailing edges, but otherwise the trailing elevators 23 and 34, and the ailerons 22 and 33, are arranged as described with reference to Figs. 1 and 2.

The control for the trailing elevators 23 and 34 which elevators, as mentioned above, are turned about their hinges on the wings 2 and 3 in the same direction, includes a shaft 7 which is mounted in suitable bearings 8 and 9 in the fuselage (not shown in Fig. 3), a control handle 10 and arms 11 and 12 at opposite ends of the shaft. Connecting rods 13 and 14 are pivotally connected to the free ends of the arms and to the corresponding elevators, so that, if the handle 10 is depressed, both elevators are lowered, as shown, and are both raised if the handle 10 is raised. Similarly as in an aileron, the angle of the elevator is positive when the trailing edge of the elevator is below the neutral position.

15 is a control stick for operating the ailerons 22 and 33. It is mounted in a bearing 16 and connected, at its lower end, to a push rod 17. The ends of the push rod are connected to bellcrank levers 18 and 19 whose free ends engage the lower ends of rods 20 and 21. The upper ends of the rods are pivotally connected to arms 24 and 25 on the ailerons 22 and 33, respectively. It will be understood that by these means the ailerons 22 and 33 are tilted in opposite directions on the individual wings and with substantially equal angular displacements from parallelism with the upper faces of said wings. Thus, if the stick 15 is moved to the right as shown, the leading edge of aileron 22 is raised and the leading edge of aileron 33 is lowered. In the vertical or neutral position of the stick both ailerons are fixedly mounted parallel to each other and substantially parallel to the upper faces of the wings; that is they assume the position shown for the aileron 22 in Fig. 1.

Obviously the ailerons when performing their functions as such, will not prevent the break in the air flow for large positive angles of the elevators 23 and 34, but this is not a drawback as normally the elevators are operated only when flying in the straight, i. e. while the ailerons are in their neutral position.

I wish it to be understood that I do not desire to be limited to the exact details of construction shown and described for obvious modifications will occur to a person skilled in the art.

I claim:

1. A wing structure for aircraft comprising a main wing portion, a lift-increasing flap constituting a continuation of the upper and lower surfaces of said main wing portion and hinged to the rear edge thereof about an axis within the contour of the wing for downward swinging to increase the lift, and a non-floating aileron of small chord relative to the flap pivotally mounted above the wing to prevent a break in the flow of air over the upper surface of the wing when the flap is swung downwardly to operative position, the pivotal axis of said aileron being approximately one aileron chord ahead of the pivotal axis of the flap and between one and two aileron chords above the pivotal axis of the flap.

2. The wing structure of claim 1, in which an aileron of large camber is provided.

3. A wing structure for aircraft comprising a pair of wings, a flap and an aileron as defined in claim 2, associated with each wing, and means for turning said ailerons in opposite directions and with substantially equal angular displacements.

4. A wing structure for aircraft comprising a pair of wings, a flap and an aileron as defined in claim 2, associated with each wing, means for turning said flaps in the same direction, and means for turning said ailerons in opposite directions and with substantially equal angular displacements.

CLAUDE DORNIER.